(12) United States Patent
Yu et al.

(10) Patent No.: US 12,119,858 B2
(45) Date of Patent: Oct. 15, 2024

(54) DATA TRANSMISSION DEVICE AND DATA TRANSMISSION METHOD

(71) Applicant: SAMSUNG ELECTRONICS CO., LTD., Suwon-si (KR)

(72) Inventors: Hyun Seok Yu, Seoul (KR); Hae-Dong Yeon, Hawseong-si (KR); Gang Minh Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 310 days.

(21) Appl. No.: 17/696,214

(22) Filed: Mar. 16, 2022

(65) Prior Publication Data

US 2022/0407551 A1 Dec. 22, 2022

(30) Foreign Application Priority Data

Jun. 16, 2021 (KR) .................. 10-2021-0078114

(51) Int. Cl.
*H04B 1/3827* (2015.01)
*H04B 17/318* (2015.01)
*H04W 52/24* (2009.01)
*H04W 52/36* (2009.01)

(52) U.S. Cl.
CPC ......... *H04B 1/3838* (2013.01); *H04B 17/318* (2015.01); *H04W 52/242* (2013.01); *H04W 52/367* (2013.01)

(58) Field of Classification Search
CPC ... H04B 1/3838; H04B 17/318; H04W 52/24; H04W 52/242; H04W 52/245; H04W 52/367
See application file for complete search history.

(56) References Cited

U.S. PATENT DOCUMENTS

| | | | |
|---|---|---|---|
| 9,444,152 B2 | 9/2016 | Park et al. | |
| 9,819,080 B2 | 11/2017 | He et al. | |
| 10,374,674 B2 | 8/2019 | Lee et al. | |
| 10,742,249 B2 | 8/2020 | Lan et al. | |
| 2019/0159129 A1* | 5/2019 | Choi ........................ | H04B 1/40 |
| 2019/0165837 A1* | 5/2019 | Son ........................ | H04B 17/12 |
| 2020/0112926 A1* | 4/2020 | Laghate ............... | H04B 7/0404 |
| 2020/0220572 A1* | 7/2020 | Kwon ................... | H04M 1/026 |

(Continued)

*Primary Examiner* — Nguyen T Vo
(74) *Attorney, Agent, or Firm* — Sughrue Mion, PLLC

(57) ABSTRACT

A data transmission device and a data transmission method are provided. The data transmission device includes: a plurality of front-end modules associated with a plurality of antennas, respectively; and a controller configured to select a front-end module to be used for data communication from among the plurality of front-end modules, wherein the controller is configured to: determine a temperature of each of the plurality of front-end modules; and select, from among the plurality of front-end modules, a front-end module having a temperature lower than or equal to a threshold temperature and corresponding to a maximum received power of a receiving device, among received powers of the receiving device corresponding to the plurality of front-end modules, and wherein each of the received powers of the receiving device is obtained based on a specific absorption rate (SAR) requirement or a maximum permissible exposure (MPE) requirement of a corresponding front-end module.

18 Claims, 11 Drawing Sheets

(56) References Cited

U.S. PATENT DOCUMENTS

| | | | |
|---|---|---|---|
| 2020/0236618 A1* | 7/2020 | Yu | G06N 3/08 |
| 2020/0295854 A1 | 9/2020 | Narra et al. | |
| 2021/0075449 A1* | 3/2021 | Lee | H03F 3/24 |
| 2021/0391913 A1* | 12/2021 | Zhou | H04W 52/146 |

* cited by examiner

DATA TRANSMISSION DEVICE AND DATA TRANSMISSION METHOD

CROSS-REFERENCE TO THE RELATED APPLICATION

This application claims priority from Korean Patent Application No. 10-2021-0078114 filed on Jun. 16, 2021 in the Korean Intellectual Property Office, and all the benefits accruing therefrom under 35 U.S.C. 119, the contents of which in its entirety are herein incorporated by reference.

BACKGROUND

1. Field

Example embodiments of the disclosure relates to a data transmission device and a data transmission method.

2. Description of Related Art

Antenna switching (AS) is a technique to avoid deterioration of transmission (Tx) antenna performance according to a change in a communication environment or user's terminal use state. The antenna switching scheme is configured to detect when signal transmission and reception of an antenna is not smooth and, based on the detection, switch the antenna to another transmission antenna based on the detection to secure call performance. In general, quality of a received signal is identified based on reference signal received power (RSRP), and a current antenna is switched to an antenna having a larger RSRP measurement.

However, as the communication environment changes, factors other than the RSRP such as heat emission from an antenna module, a specific absorption rate (SAR), and a maximum permissible exposure (MPE) should be considered in performing the antenna switching. Therefore, a method for taking the above factors into account in performing the antenna switching are being studied.

SUMMARY

A purpose of the disclosure is to provide a data transmission device that may perform antenna switching based on various factors.

Another purpose of the disclosure is to provide a data transmission method that may perform antenna switching based on various factors.

Purposes according to the disclosure are not limited to the above-mentioned purpose. Other purposes and advantages according to the disclosure that are not mentioned may be understood based on following descriptions, and may be more clearly understood based on embodiments according to the disclosure. Further, it will be easily understood that the purposes and advantages according to the disclosure may be realized using means shown in the claims and any combination thereof.

According to an aspect of an example embodiment of the disclosure, there is provided a data transmission device including: a plurality of front-end modules associated with a plurality of antennas, respectively; and a controller configured to select a front-end module to be used for data communication from among the plurality of front-end modules, wherein the controller is configured to: determine a temperature of each of the plurality of front-end modules; and select, from among the plurality of front-end modules, a front-end module having a temperature lower than or equal to a threshold temperature and corresponding to a maximum received power of a receiving device, among received powers of the receiving device corresponding to the plurality of front-end modules, and wherein each of the received powers of the receiving device is obtained based on a specific absorption rate (SAR) requirement or a maximum permissible exposure (MPE) requirement of a corresponding front-end module.

According to an aspect of an example embodiment of the disclosure, there is provided a method for transmitting data, the method including: providing a first front-end module associated with a first antenna and a second front-end module associated with a second antenna; transmitting first data to a base station by using the first front-end module associated with the first antenna; determining a first temperature of the first front-end module and a second temperature of the second front-end module; obtaining a first transmit power of the first front-end module and second transmit power of the second front-end module; obtaining a first limit power of the first front-end module and second limit power of the second front-end module based on a specific absorption rate (SAR) requirement; obtaining a first received power of the base station based on the first transmit power and the first limit power; obtaining a second received power of the base station based on the second transmit power and the second limit power; and based on the second received power being greater than the first received power, and the second temperature being lower than a threshold temperature, transmitting second data to the base station by using the second front-end module associated with the second antenna.

According to an aspect of an example embodiment of the disclosure, there is provided a method for transmitting data, the method including: providing a plurality of front-end modules respectively associated with a plurality of antennas; determining a temperature of each of the plurality of front-end modules; selecting, from among the plurality of front-end modules, at least one front-end module having a temperature equal to or lower than a threshold temperature; obtaining a received power of a base station corresponding to each of the at least one front-end module based on a specific absorption rate (SAR) requirement; and selecting, from among the selected at least one front-end module, a front-end module corresponding to a maximum received power of the base station.

BRIEF DESCRIPTION OF DRAWINGS

The above and other aspects and features of the disclosure will become more apparent by describing in detail example embodiments thereof with reference to the attached drawings, in which.

DETAILED DESCRIPTION

Hereinafter, example embodiments according to the technical idea of the disclosure will be described with reference to the accompanying drawings.

Figure 1:
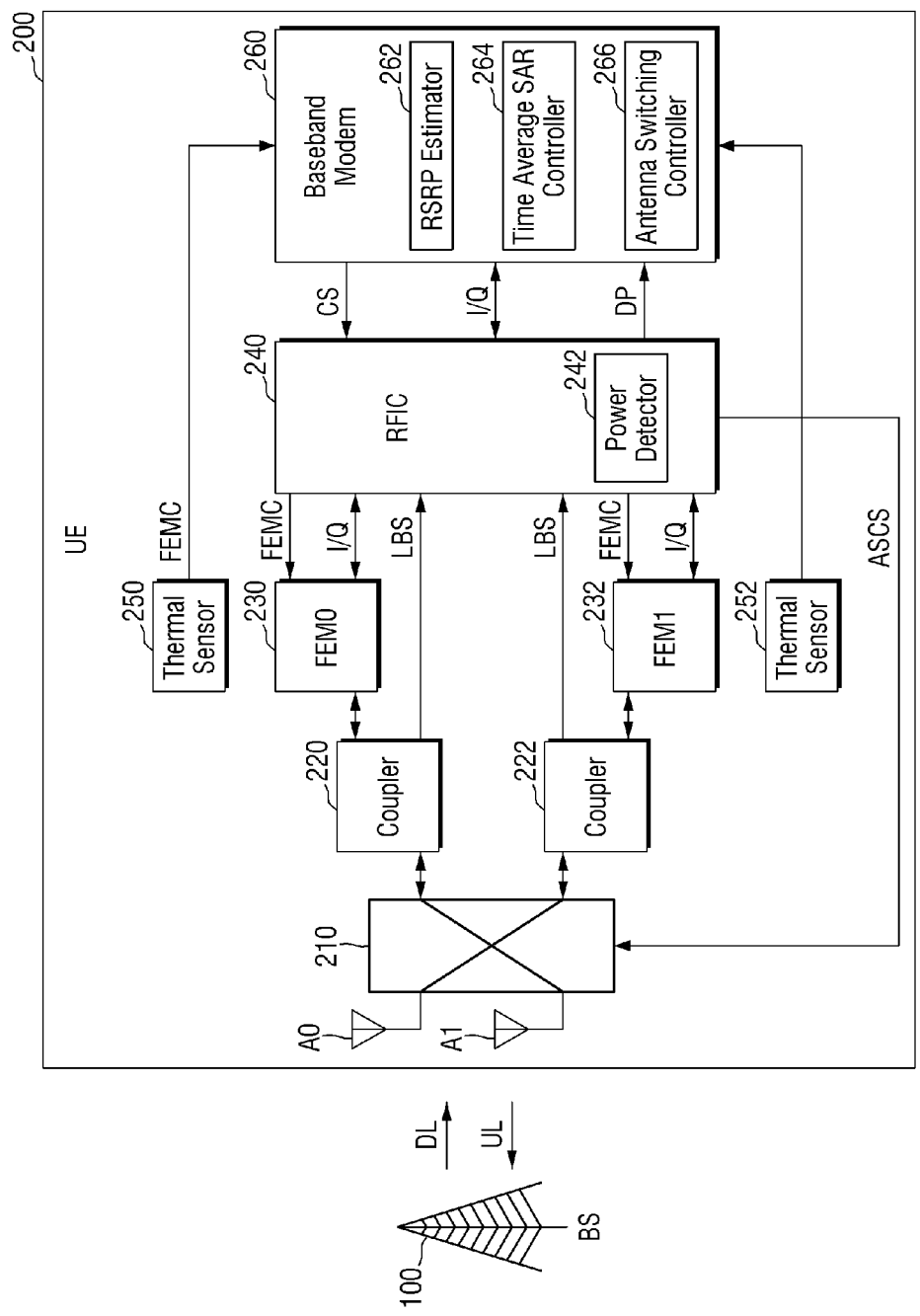
FIG. 1 is a diagram showing a wireless communication system including wireless communication equipment according to some embodiments.

FIG. 1 is a diagram showing a wireless communication system including wireless communication equipment according to some embodiments.

A wireless communication system 1 may be embodied as, for example, a wireless communication system using a cellular network such as a 5G (5th generation) wireless system, a LTE (Long Term Evolution) system, a LTE-Advanced system, a CDMA (Code Division Multiple Access) system, and a GSM (Global System for Mobile Communications system) or as embodied as a WLAN (Wireless Local Area Network) system or any other wireless communication systems.

Hereinafter, an example in which the wireless communication system 1 is embodied as a wireless communication system using a cellular network will be described. However, embodiments of the disclosure are not limited thereto.

A base station (BS) 100 may generally act as a fixed station that communicates with user equipment (UE) 200 or other base stations. The base station 100 may exchange data and control information with the user equipment 200 or another base station via communication with the user equipment 200 or another base station.

For example, the base station 100 may be referred to as Node B, eNB (evolved-Node B), gNB (Next generation Node B), a sector, a site, BTS (Base Transceiver System), AP (Access Point), a relay node, RRH (Remote Radio Head), RU (Radio Unit), a small cell, or the like.

In the disclosure, the base station or the cell may be comprehensively interpreted as a partial area or a function covered with or performed by BSC (Base Station Controller) in CDMA, Node-B in WCDMA, eNB in LTE, gNB in 5G or the sector or the site, etc. The base station or the cell may include various coverage areas such as a megacell, a macrocell, a microcell, a picocell, a femtocell and a relay node, RRH, RU, and a small cell.

The user equipment 200 may be fixed or mobile. For example, the UE may refer to any equipment capable of communicating with the base station 100 or another base station (not shown) to transmit and receive data and/or control information thereto and/or therefrom. For example, the user equipment 200 may be referred to as a terminal, terminal equipment, MS (Mobile Station), MT (Mobile Terminal), UT (User Terminal), SS (Subscribe Station), a wireless device, a handheld device, or the like.

Hereinafter, an example in which the user equipment 200 is embodied as wireless communication equipment will be described. However, embodiments of the disclosure are not limited thereto.

A wireless communication network between the user equipment 200 and the base station 100 may allow multiple of users to communicate with each other while sharing available network resources. For example, in the wireless communication network, information may be delivered in various multiple access schemes such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), OFDM-FDMA, OFDM-TDMA, OFDM-CDMA, etc.

As shown in FIG. 1, the user equipment 200 may communicate with the base station 100 via uplink UL and downlink DL. In some embodiments, UEs may communicate with each other via a sidelink such as a D2D (Device-to-Device) sidelink.

The user equipment 200 may support access to two or more wireless communication systems. For example, the user equipment 200 may access first and second wireless communication systems that are different from each other, where the first wireless communication system may use a higher frequency band than that of the second wireless communication system.

For example, the first wireless communication system may be embodied as a wireless communication system (e.g., 5G) using millimeter wave (mmWave), while the second wireless communication system may be embodied as a wireless communication system (e.g., LTE) using a frequency band lower than the millimeter wave (mmWave). Thus, the second wireless communication system may be referred to as a legacy wireless communication system.

The user equipment 200 may access each of the first wireless communication system and the second wireless communication system via each of different base stations in some embodiments. In other embodiments, the UE 200 may access each of the first wireless communication system and the second wireless communication system via one base station 100.

Further, in some embodiment, the user equipment 200 may support access to three or more different wireless communication systems.

The user equipment 200 may include a plurality of antennas A0 and A1, a switching circuit 210, a plurality of couplers 220 and 222, a plurality of front-end modules (FEM) FEM0 230 and FEM1 232, a RFIC (Radio Frequency IC) 240, a plurality of temperature sensor 250 and 252, and a baseband modem 260.

Although, for convenience of description, in FIG. 1, the user equipment 200 is shown to include two antennas A0 and A1, two couplers 220 and 222, two front-end modules 230 and 232, and two temperature sensors 250 and 252, the disclosure is not limited thereto. In some embodiments, the user equipment 200 may be modified to include 4 antennas, 4 couplers, 4 front-end modules and 4 temperature sensors. In some other embodiments, the user equipment 200 may be modified to include a larger number of antennas, couplers, front-end modules, and temperature sensors.

The plurality of antennas A0 and A1 may be used for beamforming, and may be used to transmit or receive signals polarized in different directions. Further, the plurality of antennas A0 and A1 may constitute a phased array antenna.

The front-end modules 230 and 232 may be linked to the plurality of antennas A0 and A1, respectively. For example, the front-end module 230 may be linked to the antenna A0, while the front-end module 232 may be linked to the antenna A1. However, embodiments of the disclosure are not limited thereto. A larger number of antennas may be linked to the front-end module 230, and a larger number of antennas may be linked to the front-end module 232.

The switching circuit 210 may switch paths via which the antennas A0 and A1 transmit or receive data under control of the RFIC 240. For example, the switching circuit 210 may switch a path via which the front-end module 230 receives data via the antenna A0 to a path via which the front-end module 232 receives data via the antenna A1, based on an antenna switch control signal ASCS provided from the RFIC 240. Further, the switching circuit 210 may switch a path via which the front-end module 230 transmits data via the antenna A0 to a path via which the front-end module 232 transmits data via the antenna A1, based on the antenna switch control signal ASCS provided from the RFIC 240.

The couplers 220 and 222 may connect the switching circuit 210 to the front-end modules 230 and 232, respectively. Each of the couplers 220 and 222 may generate a loopback signal LBS from an output of each of the front-end module 230 and 232 and provide the loopback signal to the RFIC 240.

Each of the front-end modules 230 and 232 includes a low noise amplifier (LNA), a power amplifier (PA), a RX phase shifter (RX_PS), a TX phase shifter (TX_PS), etc.

Each of the front-end modules 230 and 232 may be controlled based on a control signal FEMC applied from the RFIC 240, and may provide an Isignal I and a Qsignal Q to the RFIC 240 based on a signal received through each of the antennas A0 and A1. Further, each of the front-end modules 230 and 232 may be controlled by the control signal FEMC applied from RFIC 240, and may receive the Isignal I and the Qsignal Q from the RFIC 240, and may transmit a signal through each of the antennas A0 and A1 based on the Isignal I and the Qsignal Q.

Each of the temperature sensors 250 and 252 may sense a temperature of each of the front-end modules 230 and 232. When the front-end modules 230 and 232 transmit or receive signals, heat may be generated from the low noise amplifier and/or the power amplifier included in the front-end modules 230 and 232. The temperature sensors 250 and 252 may be used to sense heat emission amounts from the front-end modules 230 and 232, respectively. Although FIG. 1 shows that each of the temperature sensors 250 and 252 is separated from each of the front-end modules 230 and 232, embodiments of the disclosure are not limited thereto. In some embodiments, the temperature sensors 250 and 252 may be implemented to be included in the front-end modules 230 and 232, respectively.

The RFIC 240 may apply the control signal FEMC for data reception to each of the front-end modules 230 and 232, and may receive the Isignal I and the Qsignal Q from each of the front-end modules 230 and 232. Further, in order to transmit data, the RFIC 240 may apply the control signal FEMC for data transmission to each of the front-end modules 230 and 232 and may transmit the Isignal I and the Qsignal Q to each of the front-end modules 230 and 232. Further, in a situation where the antenna switching is required, the RFIC 240 may apply the antenna switch control signal ASCS to the switching circuit 210 to switch the antenna A0 and A1 and the front-end modules 230 and 232 which are in an active state.

The RFIC 240 may include a power detector 242. The power detector 242 may detect power of the loopback signal LBS generated from each of the couplers 220 and 222, and may provide the detected power DP to the baseband modem 260 such that the baseband modem 260 may calculate limit power PSARLIMIT(i) based on a specific absorption rate (SAR) of each of the front-end modules 230 and 232. Further, in some embodiments, the power detector 242 may detect power of the loopback signal LBS generated from each of the couplers 220 and 222, and may provide the detected power DP to the baseband modem 260 such that the baseband modem 260 calculates the limit power PSARLIMIT(i) based on a maximum permissible exposure (MPE) requirement (or compliance) of each of the front-end modules 230 and 232. More detailed descriptions thereof will be described later.

The baseband modem 260 may receive the Isignal I and the Qsignal Q from the RFIC 240 for data reception, or may provide the Isignal I and the Qsignal Q to the RFIC 240 for data transmission.

The baseband modem 260 may serve as a controller that applies a control signal CS to the RFIC 240 to control an operation of the user equipment 200. That is, in this embodiment, a case in which the baseband modem 260 acts as a controller that controls the operation of the user equipment 200 will be described. Embodiments of the disclosure are not limited thereto.

The baseband modem 260 may apply the control signal CS to the RFIC 240 to select the antenna A0 or A1 and the front-end module 230 or 232 to be used for signal transmission or reception. To this end, the baseband modem 260 may include a RSRP estimator 262, a SAR controller 264 and an antenna switching controller 266. The baseband modem 260 may receive temperature information of each of the front-end modules 230 and 232 from each of the temperature sensors 250 and 252, and receive the detected power DP from the RFIC 240.

The RSRP estimator 262 may measure the RSRP of each of the antennas A0 and A1 and each of the front-end modules 230 and 232 that are currently receiving a signal or transmitting a signal.

The SAR controller 264 may calculate a SAR value or a PD (power density) value based on the detected power DP. The antenna switching controller 266 may control whether or not to switch an antenna based on the RSRP, the SAR value, the temperature information, etc.

In an example embodiment, the baseband modem 260 may determine whether to switch an antenna based on comprehensive consideration of the RSRP, the SAR value, and heat emission information. That is, the baseband modem 260 may determine whether to switch an antenna based on the RSRP, the SAR value and the heat emission information rather than based on only the RSRP.

Hereinafter, with reference to FIG. 2 to FIG. 10, an operation of each of the baseband modem 260 and the user equipment 200 will be described in more detail.

Figure 2:
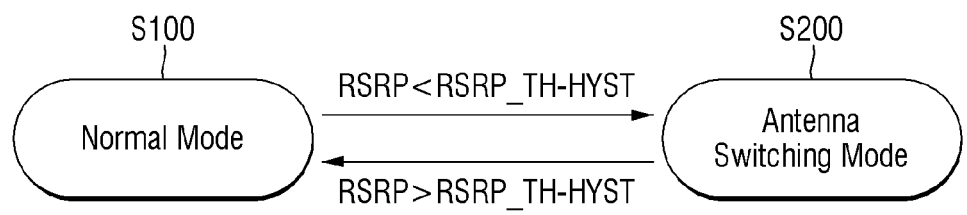
FIG. 2 and FIG. 3 are state diagrams of user equipment according to some embodiments.
Figure 3:
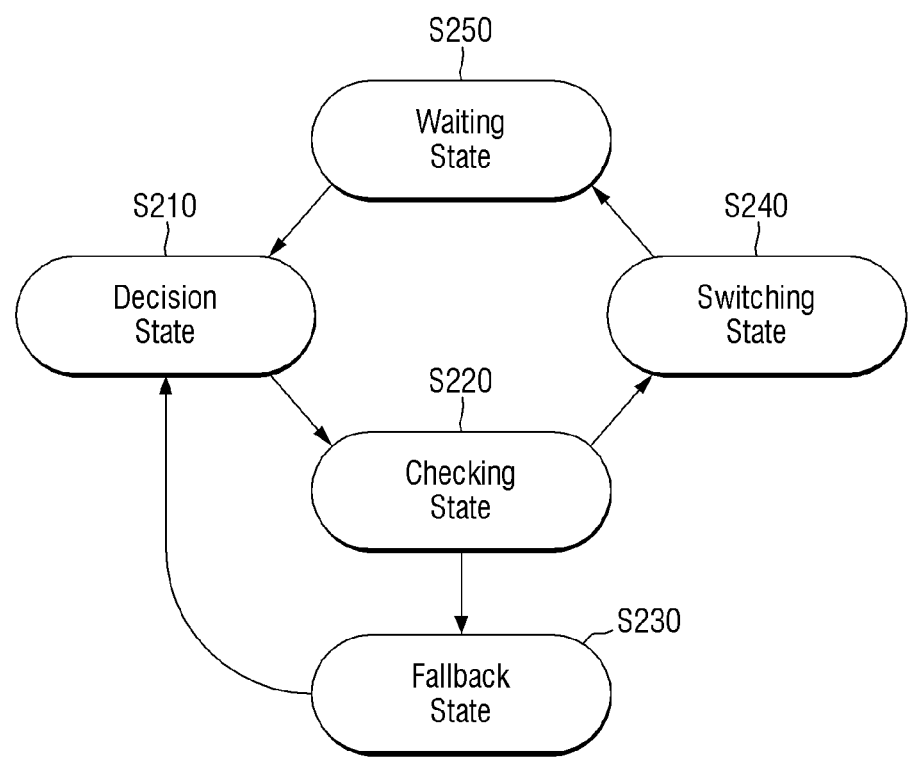
Figure 4:
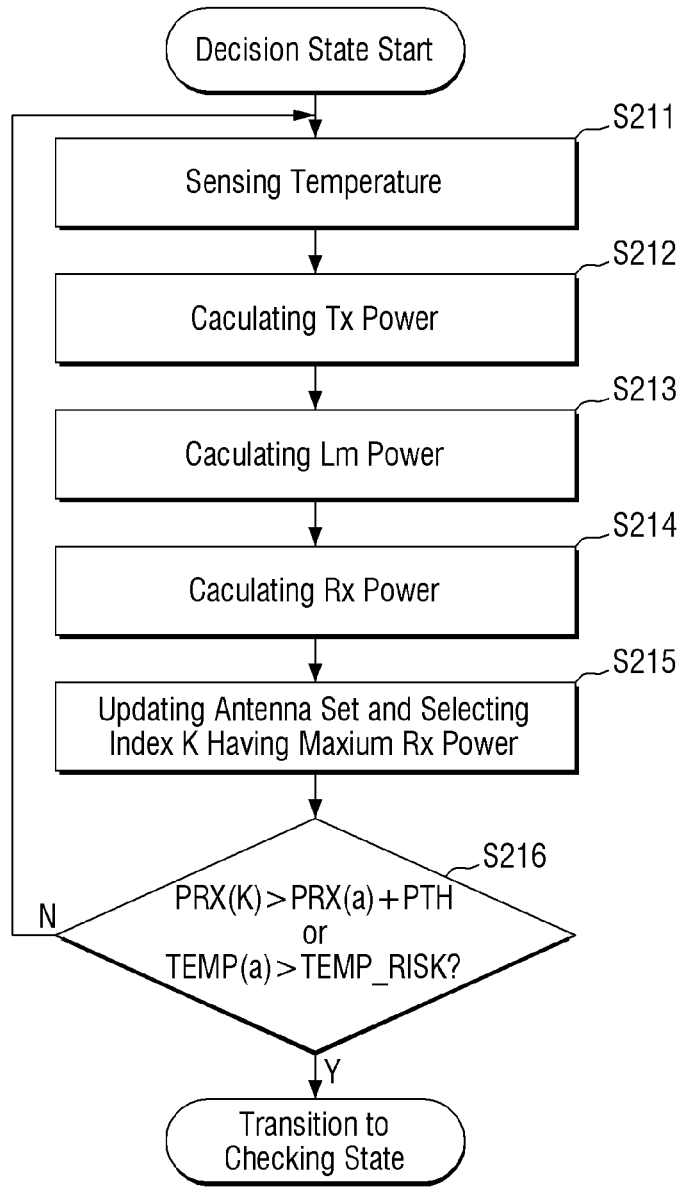
FIG. 4 is a flowchart showing an operation of user equipment in a decision state of FIG. 3.

FIG. 2 and FIG. 3 are state diagrams of user equipment according to some embodiments. FIG. 4 is a flowchart showing an operation of user equipment in a decision state of FIG. 3. FIG. 5 to FIG. 9 are diagrams to illustrate an operation of FIG. 4. FIG. 10 is a flowchart showing an operation of user equipment in a checking state of FIG. 3.

First, referring to FIG. 1 and FIG. 2, the user equipment 200 may operate in one of a normal mode S100 and an antenna switching mode S200.

For example, the baseband modem 260 may measure the RSRP of the antenna and the front-end module that are currently used to transmit or receive data. When the RSRP of each of the antenna and the front-end module currently used to transmit or receive data is greater than a threshold value RSRP_TH, the baseband modem 260 may operate in the normal mode S100 and the antenna switching is not performed. That is, the antenna switching is not always necessary when considering the purpose for the antenna switching.

In a situation in which sufficient reception performance and transmission performance are achieved because sufficient RSRP(i) is already secured, a switching operation to increase transmission and reception performance is unnecessary. Further, in a strong electric field where the RSRP of each of the antenna and the front-end module currently used to transmit or receive data is sufficiently larger, a path loss due to data transmission and reception is smaller. Thus, transmit power (Tx power) is small, so that there may be no probability that the specific absorption rate (SAR) requirement (or compliance) or the maximum permissible exposure (MPE) requirement (or compliance) related to the transmit power (Tx Power) is violated. Furthermore, because the transmit power (Tx power) is small, the heat emission from the power amplifier PA of the front-end module is also insignificant, and thus there is no heat emission related problem. Therefore, when the RSRP of each of the antenna and the front-end module currently used to transmit or receive data is greater than the threshold value RSRP_TH, the baseband modem 260 may operate in the normal mode S100 in which the antenna switching is not performed.

In some embodiments, a magnitude of the RSRP value generally varies. Thus, in order to avoid excessive mode change, a predetermined hysteresis value may be used. In this case, when the RSRP of each of the antenna and the front-end module currently used to transmit or receive data is greater than a difference between the threshold value RSRP_TH and a hysteresis value HYST, the baseband modem 260 may operate in the normal mode S100 in which the antenna switching is not performed.

Conversely, when the RSRP of each of the antenna and the front-end module currently used for transmitting or receiving data is smaller than the threshold value RSRP_TH, the antenna switching is needed to improve signal transmission and reception quality (QoS). Therefore, the baseband modem 260 may operate in the antenna switching mode S200 in which the antenna switching is performed, when the RSRP of each of the antenna and the front-end module currently used to transmit or receive data is smaller than the threshold value RSRP_TH.

In this case, a predetermined hysteresis value may be applied similarly. That is, the baseband modem 260 may operate in the antenna switching mode S200 in which the antenna switching is performed, when the RSRP of each of the antenna and the front-end module currently used to transmit or receive data is smaller than a difference between the threshold value RSRP_TH and the hysteresis value HYST.

When the user equipment 200 may operate in the antenna switching mode S200, the user equipment 200 may transition to between operation states shown in FIG. 3.

Referring to FIG. 1 and FIG. 3, the user equipment 200 may operate in one of a decision state S210, a checking state S220, a fallback state S230, a switching state S240, and a waiting state S250 in the antenna switching mode S200.

In the decision state S210, the UE 200 may search for an antenna and a front-end module that may exhibit performance higher than those of the antenna and the front-end module currently used to transmit or receive data, and may monitor a heat emission state of the front-end module currently used to transmit or receive data. The searching and monitoring operations may be repeatedly performed according to a predetermined period or may be performed in response to a specific event.

Referring to FIG. 1 and FIG. 4, the UE 200 senses a temperature in S211.

For example, the baseband modem 260 may receive sensed temperature information of the front-end module 230 from the temperature sensor 250 and receive sensed temperature information of the front-end module 232 from the temperature sensor 252. The temperature information may be used to identify the heat emission state of each of the front-end modules 230 and 232. Although an operation of sensing the temperature is shown first in FIG. 4, embodiments are not limited to the order as shown. The temperature sensing operation may be performed at any time before an operation S215 to update an antenna set.

Next, antenna-specific transmit power is calculated in S212.

Figure 5:
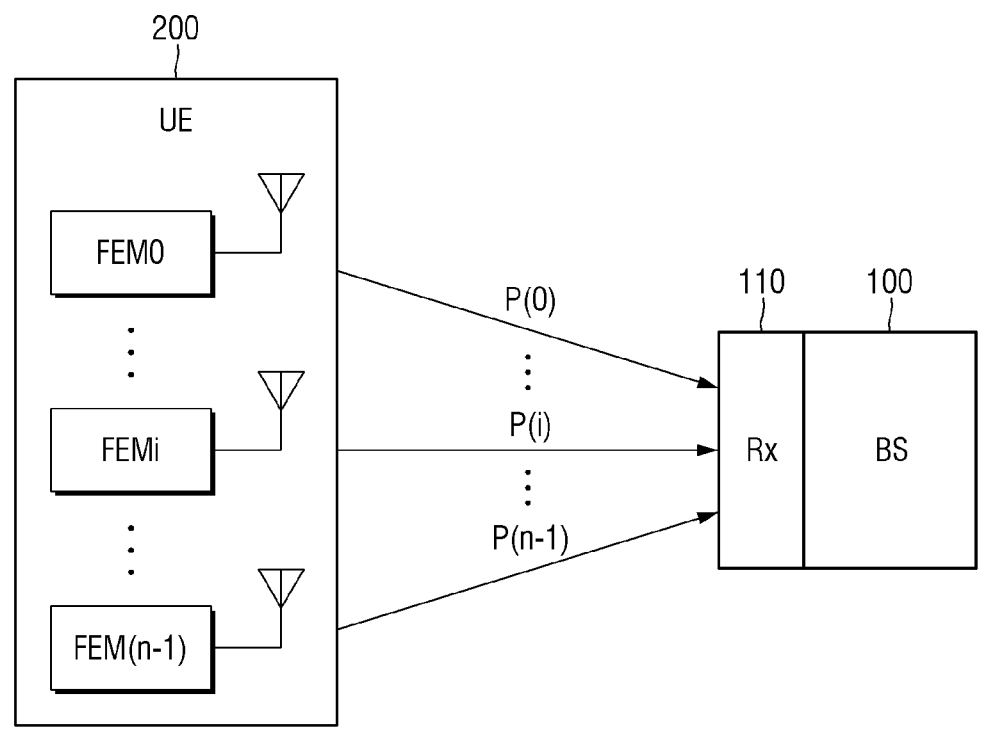
FIG. 5 to FIG. 9 are diagrams to illustrate an operation of FIG. 4.

Referring to FIG. 1 and FIG. 5, the baseband modem 260 may calculate the transmit power (Tx Power) of each of the front-end modules included in the user equipment 200.

In FIG. 5, when assuming that the user equipment 200 includes n (n is a natural number) antennas and n front-end modules, P(0) denotes transmit power when transmitting a signal using a front-end module and an antenna having an index 0. P(i) denotes transmit power when transmitting a signal using a front-end module and an antenna having an index I, where i is a natural number greater than 0 and smaller than n−1. P(n−1) denotes transmit power when transmitting a signal using a front-end module and an antenna having an index n−1.

The P(i) may be calculated based on a channel formed between the user equipment 200 and the base station 100. In one example, when the channel is Physical Uplink Shared Channel (PUSCH), P(i) may be calculated based on the following Equation 1, where a number is based on not a linear scale but a decibel scale (dB scale).

$$P(i) = \min\begin{Bmatrix} P_{Cmax} \\ 10\log_{10}(M_{PUSCH}) + P_{O-PUSCH} + \alpha \cdot PL + \Delta_{TF} + f \end{Bmatrix} \quad \text{Equation 1}$$

where $P_{Cmax}$ denotes a maximum transmit power level defined in a standard, $M_{PUSCH}$ denotes a resource block (RB) size of the channel, α denotes a proportional constant between 0 and 1, and is indicated by the base station, PL (Path Loss) denotes a path loss value estimated based on RSRP, and $\Delta_{TF}$ denotes an offset value according to a transmit format indicated in an uplink grant (UL) grant.

Although the above case has been described when the channel is the PUSCH, embodiments of the disclosure are not limited thereto. A method for calculating P(i) may be modified based on a type of the channel formed between the user equipment 200 and the base station 100.

Next, referring to FIG. 4, each antenna-specific (or front-end module-specific) limit power (Lm Power) is calculated in S213.

The transmit power of the user equipment 200 may be related to energy radiated from the user equipment 200 as well as power consumption of the user equipment 200. That is, a strong electromagnetic field may be generated from RF signals generated with high transmit power in the user equipment 200. A user may be exposed to the electromagnetic field and thus may absorb energy from the user equipment 200.

The specific absorption rate (SAR) may refer to a rate of absorption of energy by a human body when being exposed to an RF electromagnetic field. The specific absorption rate (SAR) from an electronic equipment is regulated not to exceed a certain level. Accordingly, the specific absorption rate (SAR) requirement is regulated. Similarly, when the millimeter wave is used, the maximum permissible exposure (MPE) requirement is regulated.

The antenna-specific (or front-end module-specific) limit power PSARLIMIT(i) may be calculated in consideration of the specific absorption rate (SAR) requirement. Alternatively, the antenna-specific (or front-end module-specific)

limit power PSARLIMIT(i) may be calculated in consideration of the maximum permissible exposure (MPE) requirement.

Figure 6:
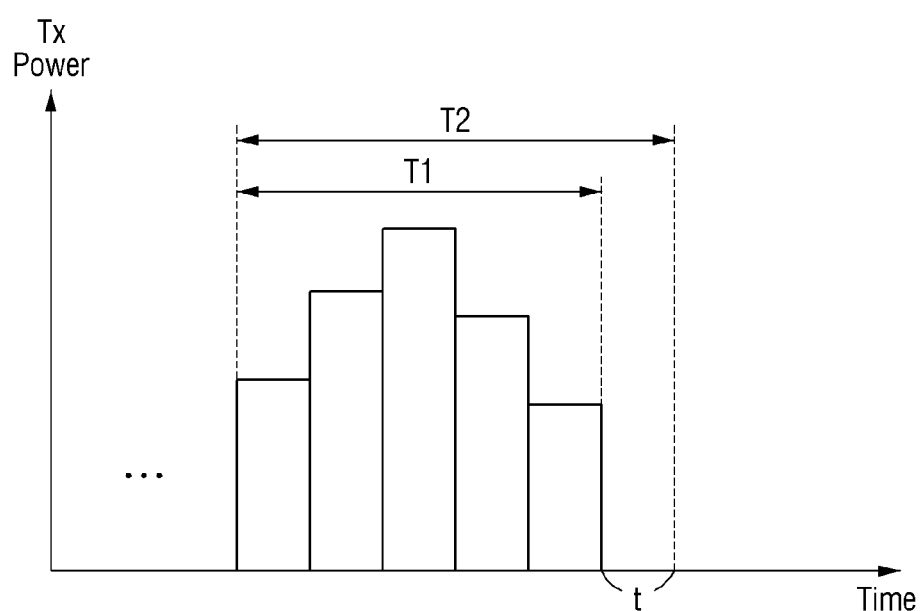

Referring to FIG. 1 and FIG. 6, the baseband modem 260 may calculate PSARLIMIT(i) as the limit power of each front-end module included in the user equipment 200, based on remaining power. FIG. 6 is a graph showing power radiated using an antenna and a front-end module having an index i in each unit time interval.

For example, the baseband modem 260 may calculate the remaining power by subtracting power already radiated for a period T1 from power which can be radiated in consideration of the specific absorption rate (SAR) requirement for a period T2 using an antenna and a front-end module having an index i. Thus, the baseband modem 260 may calculate the limit power PSARLIMIT(i) corresponding to a current time interval t. However, embodiments of the disclosure are not limited thereto. The scheme of calculation of PSARLIMIT(i) may be modified in various manner.

Next, referring to FIG. 4, each antenna-specific received power (Rx Power) is calculated in S214.

In an example embodiment, instead of performing the antenna switching based on the transmit power (P(0) to P(n−1) in FIG. 5) of the user equipment 200, the antenna switching may be performed based on the received power of a receiver 110 of the base station 100 shown in FIG. 5. First, concept of the received power of the receiver 110 of the base station 100 will be described.

When a signal is transmitted using a front-end module and an antenna having an index i, received power PRX(i) of the receiver 110 of the base station 100 may be calculated based on the following Equation 2.

$$PRX(i)=P(i)-PL(i)+Gb \qquad \text{Equation 2}$$

where P(i) denotes the transmit power when transmitting data using the front-end module and the antenna having the index i, PL(i) denotes a path loss when transmitting data using the front-end module and the antenna having the index i, and Gb denotes a gain of a reception antenna of the base station.

Figure 7:
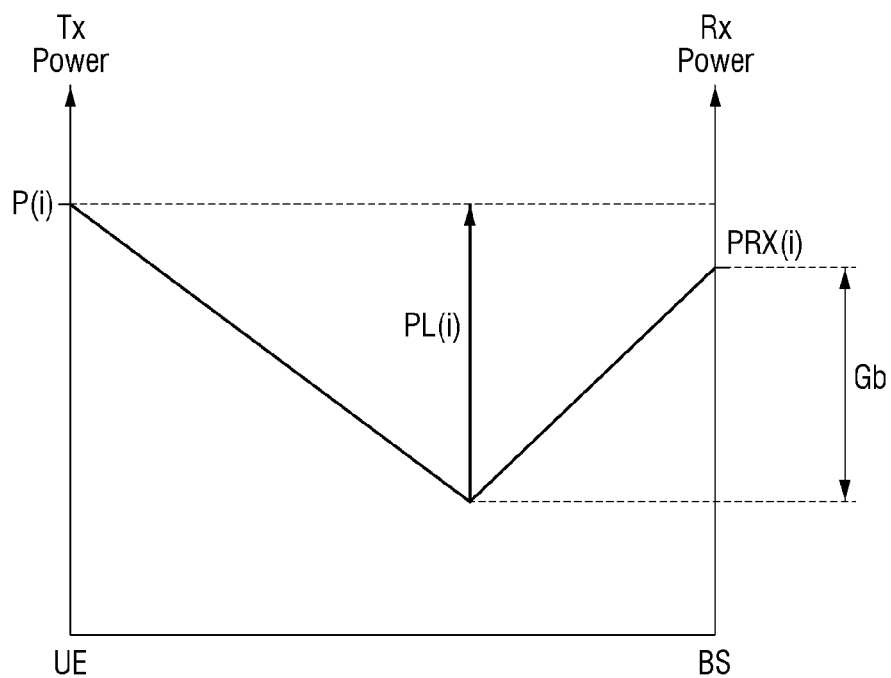

Referring to FIG. 7, the received power PRX(i) of the base station BS when transmitting a signal using the front-end module and the antenna having the index i may be obtained by subtracting the path loss PL(i) from the transmit power P(i) of the front-end module and the antenna having the index i and then adding the reception gain Gb of the receiver thereto.

In an example embodiment, when calculating PRX(i) as the received power of the base station BS, not only the transmit power P(i) is considered, but also the limit power PSARLIMIT(i) is considered. That is, in this embodiment, PRX(i) as the received power of the receiver 110 of the base station 100 is calculated by the baseband modem 260 based on the following Equation 3:

$$PRX(i)=\text{Min}(PSARLIMIT(i)-d,P(i))-PL(i)+Gb \qquad \text{Equation 3}$$

where PSARLIMIT(i) denotes the limit power when transmitting data using the front-end module and the antenna having the index i, d denotes a margin value according to the SAR requirement, P(i) denotes the transmit power when transmitting data using the front-end module and the antenna having the index i, PL(i) denotes the path loss when transmitting data using the front-end module and the antenna having the index i, and Gb denotes the gain of the reception antenna of the base station.

Figure 8:
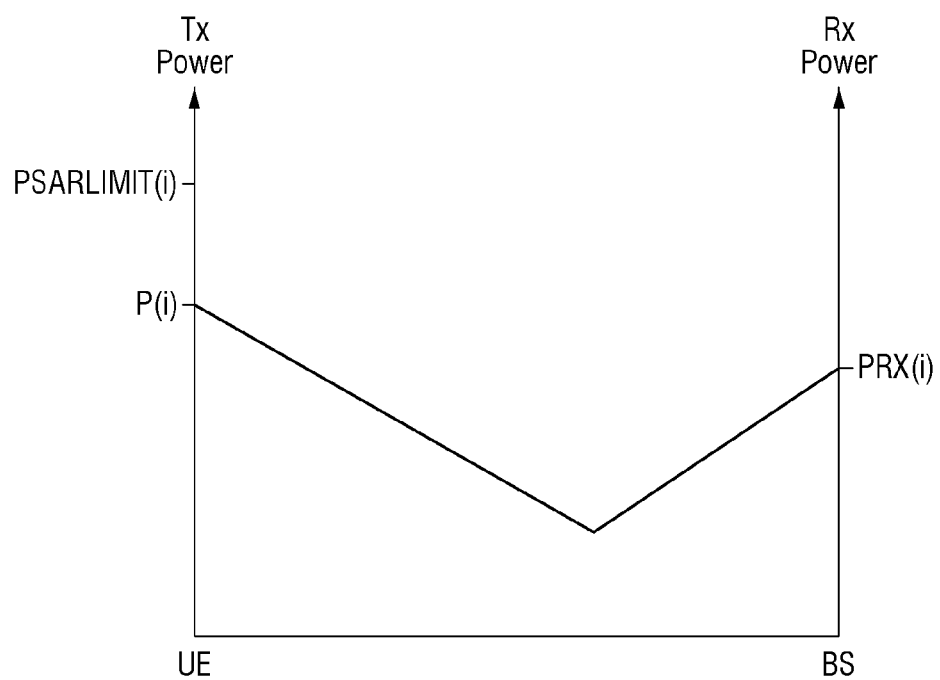

That is, in an example embodiment, as shown in FIG. 8, when the transmit power P(i) is smaller than PSARLIMIT (i), PRX(i) as the received power is calculated based on the transmit power P(i). Accordingly, while the user equipment 200 satisfies the specific absorption rate (SAR) requirement, the UE 200 may transmit data to the base station 100 at a maximum power level using the front-end module and the antenna having the index i.

Figure 9:
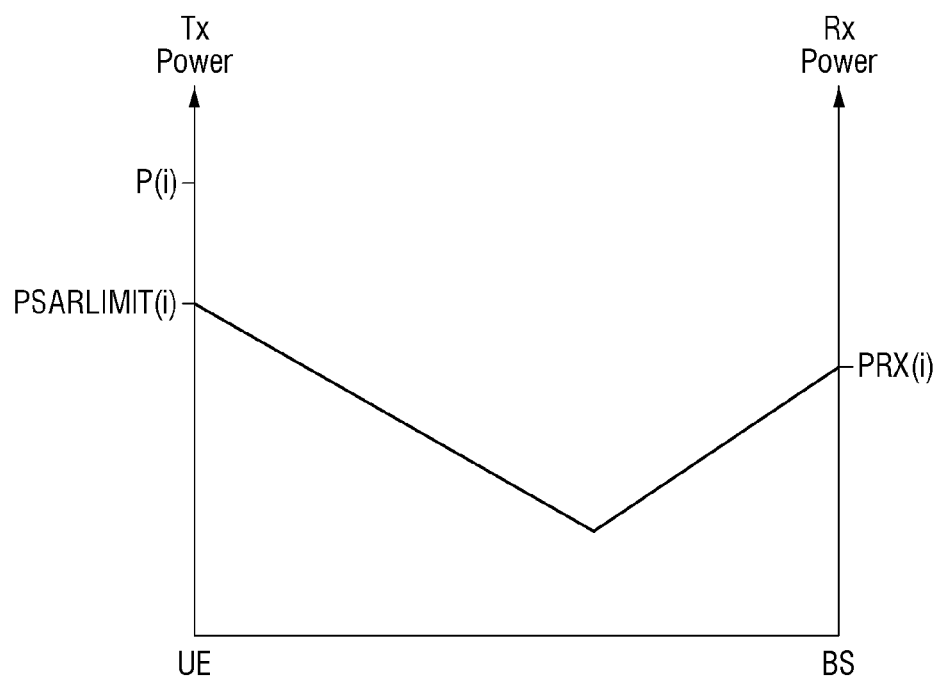
Figure 10:
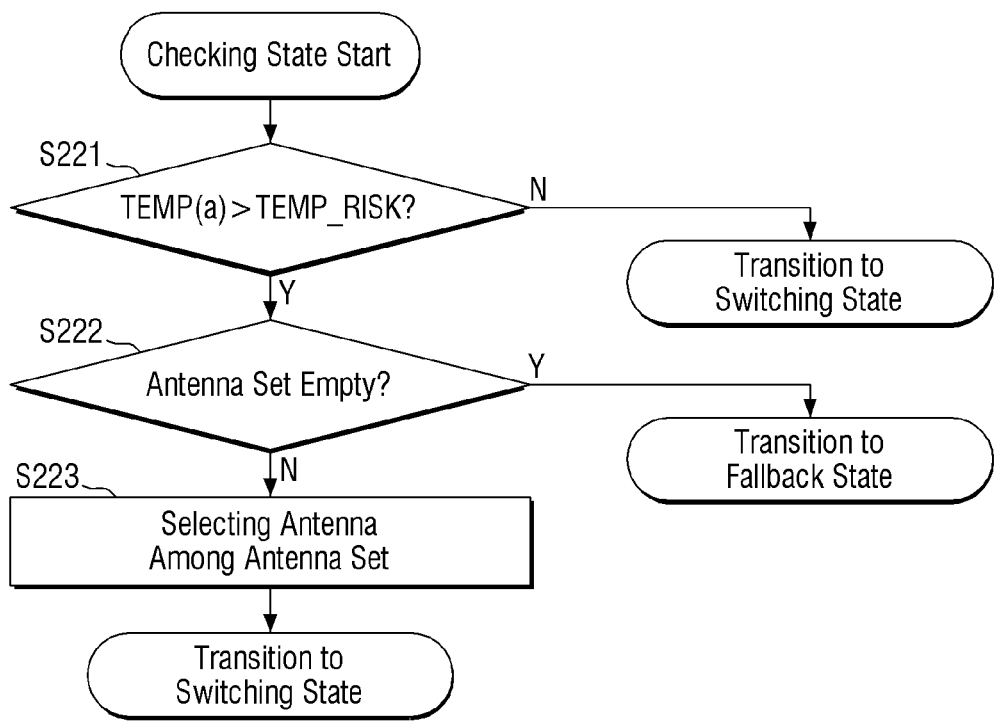
FIG. 10 is a flowchart showing an operation of user equipment in a checking state of FIG. 3.

In another example, as shown in FIG. 9, when the limit power PSARLIMIT(i) is smaller than P(i), PRX(i) as the received power is calculated based on the limit power PSARLIMIT(i). Accordingly, although the limit power is smaller than the transmit power of each of the front-end module and the antenna whose the index is i, the user equipment 200 may transmit data to the base station 100 at a maximum power level while satisfying the specific absorption rate (SAR) requirement.

Next, referring to FIG. 4, the antenna set is updated and an index corresponding to a maximum received power is selected in S215.

In a previous step S214, the front-end module and the antenna having the maximum received power are not subjected to the antenna switching when the heat emission of the front-end module is large. That is, the front-end module and the antenna having the maximum received power may not be selected as a target to which a current antenna is to be switched if the heat emission of the corresponding front-end module is large.

Therefore, an index of an antenna that is subjected to the antenna switching satisfies a condition of the following Equation 4:

$$\text{Antenna index} = \underset{i,i \in \text{Antenna Set}}{\text{argmax}} (PRX(i)) \qquad \text{Equation 4}$$

$$\text{Antenna set} = \{i \mid Temp(i) < \text{TEMP\_TH}\}$$

That is, only an antenna linked to a front-end module whose a temperature is lower than a threshold temperature TEMP TH as a reference value may be included in an antenna set in which an antenna is subjected to antenna switching. For example, the threshold temperature may be determined based on value related to a heat emission risk. Thus, the user equipment 200 may select a switching target only from among antennas included in the antenna set.

The baseband modem 260 may select K as an index of an antenna having the maximum received power from among the antennas included in the antenna set, and as an index of a front-end module linked thereto.

Next, referring to FIG. 4, it is determined whether the received power of each of the front-end module and the antenna having the index K is greater than received power of a front-end module and an antenna having an index a that are currently used for data transmission and reception in S216.

When the received power PRX(K) of each of the front-end module and the antenna having the index K is greater than a sum of a threshold power PTH and the received power PRX(a) of each of the front-end module and the antenna having the index a that are currently used for data transmission and reception (S216-Y), it indicates that signal quality may be improved by using the antenna switching, and therefore, the UE enters the checking state.

Conversely, when the received power PRX(K) of each of the front-end module and the antenna having the index K is smaller than the sum of the threshold power PTH and the received power PRX(a) of each of the front-end module and the antenna having the index a that are currently used for data transmission and reception (S216-N), the process described above is repeated again because the signal quality may not be improved due to the antenna switching.

In one example, it is determined whether a temperature of each of the front-end module and the antenna having the index a that are currently used for data transmission and reception is higher than a threshold temperature TEMP_RISK in S216.

When a temperature TEMP(a) of each of the front-end module and the antenna having the index a and currently used for data transmission and reception is higher than the threshold temperature TEMP_RISK (S216-Y), it indicates that due to the heat emission problem, the front-end module and the antenna whose the index is a and which are currently used for data transmission and reception cannot be used continuously, and therefore, the UE enters the checking state. In an example embodiment, the UE may enter the checking state when the temperature TEMP(a) of any one of the front-end module and the antenna having the index a and currently used for data transmission and reception is higher than the threshold temperature TEMP_RISK.

Conversely, when the temperature TEMP(a) of each of the front-end module and antenna having the index a and currently used for data transmission and reception is lower than the threshold temperature TEMP_RISK (S216-N), the process as described above is repeated (return to S211).

Referring back to FIG. 3, the checking state S220 refers to a state in which the UE identifies whether an antenna which may be subjected to the antenna switching is present in the antenna set.

Referring to FIG. 10, it is determined whether the temperature TEMP(a) of each of the front-end module and the antenna having the index a and currently used for data transmission and reception is higher than the threshold temperature TEMP_RISK in S221.

When the temperature TEMP(a) of each of the front-end module and the antenna having the index a and currently used for data transmission and reception is lower than the threshold temperature TEMP_RISK (S221-N), it indicates that the switching from the decision state (S210 in FIG. 3) to the checking state (S220 in FIG. 3) is not due to the heat emission issue, and as described above, the heat emission state of the switching target is already identified when the antenna and the front-end module having the maximum received power are selected in the decision state (S210 of FIG. 3). Therefore, the UE enters the switching state.

However, when the temperature TEMP(a) of each of the front-end module and the antenna having the index a and currently used for data transmission and reception is greater than the threshold temperature TEMP_RISK (S221-Y), the switching from the decision state (S210 in FIG. 3) to the checking state (S220 in FIG. 3) is due to the heat emission issue of each of the front-end module and the antenna currently used for data transmission and reception. Therefore, it is identified whether the antenna set is empty in S222.

When the antenna set is not empty (S222-N), a switching target is selected from among the antennas included in the antenna set and the front-end module linked thereto in S223. In this case, the antenna and the front-end module with the lowest temperature may be selected as the switching target. Alternatively, the switching target may be selected based on the received power of the base station. Then, the UE enters the switching state for the antenna switching.

When the antenna set is empty (S222-Y), there is no switching target antenna that satisfies the heat emission condition. Thus, the UE needs to fall back to a lower legacy RAT (Radio Access Technology) to remove the heat emission issue. Therefore, the UE enters the fallback state S230.

Referring back to FIG. 3, the fallback state S230 may be a state in which the UE may operate using a lower legacy RAT than the current RAT. For example, the fallback state S230 may be a state in which the user equipment 200, which previously performed communication using a first frequency, performs communication using a second frequency (fallback frequency) lower than the first frequency.

For example, when the user equipment 200 may operate in 5G, the UE may fall back to 4G or 3G. Further, when the user equipment 200 may operate in 4G, the UE may fall back to 3G. Because in the fallback state S230, the heat emission issue exists in the user equipment 200, a timer of the user equipment 200 may be turned on to secure a predetermined cooling time duration. While the timer is turned on, the UE may not perform communication using a higher frequency than the fallback frequency. After a certain time duration has elapsed, the UE may re-enter the decision state S210.

Referring back to FIG. 3, the switching state S240 refers to a state in which switching to the front-end module and the antenna having a selected index is performed. The waiting state S250 may refer to a state in which the UE is waiting for a predetermined time duration to prevent frequent switching after the switching to the front-end module and antenna of the selected index has been performed.

In the switching state S240, the baseband modem 260 may switch the front-end module and the antenna currently used for data transmission and reception to the front-end module and the antenna having the selected index, respectively. For example, the baseband modem 260 may control an antenna switch and a module switch, and may enable or disable the front-end module. Further, the baseband modem 260 may set setting values of the low noise amplifier (LNA), and the power amplifier (PA) of the enabled front-end module.

When this switching operation has been completed, the UE may enter the waiting state S250 and thus the timer of the user equipment 200 may be turned on. While the timer is turned on, the antenna switching is not performed. This is intended to limit excessively frequent antenna switching and to allocate the cooling time duration to elements such as the front-end module. When this predetermined time duration has elapsed, the UE may enter the decision state S210 again.

In this way, in an example embodiment, the antenna switching is performed in consideration of not only the transmit power of each of the antenna and the front-end module, but also the received power of the base station based on the heat emission state of each of the antenna and the front-end module and the SAR requirement. Thus, effective antenna switching may be performed.

Figure 11:
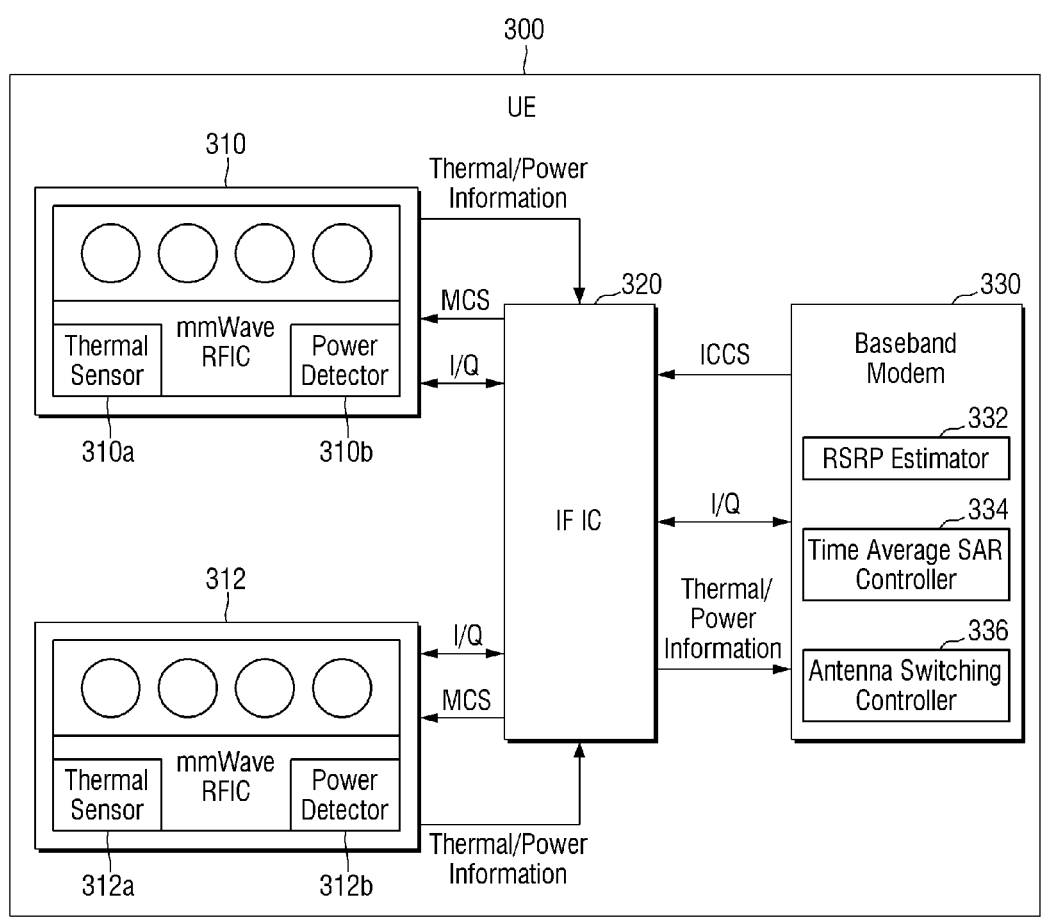
FIG. 11 is a diagram showing user equipment according to some embodiments.

FIG. 11 is a diagram showing user equipment according to some embodiments.

Referring to FIG. 11, user equipment 300 may include a plurality of antenna modules 310 and 312, an inter frequency integrated circuit (IFIC) 320, and a baseband modem 330.

Although, for convenience of description, the user equipment 300 is shown to include two antenna modules 310 and 312 in FIG. 11, embodiments are not limited thereto. In some embodiments, the user equipment 300 may be modified and implemented to include four antenna modules. In some other embodiments, the user equipment 300 may be modified and implemented to include a larger number of antenna modules.

Each of the plurality of antenna modules 310 and 312 may be used for beamforming, and may be used to transmit or receive signals polarized in different directions.

Each of the plurality of antenna modules 310 and 312 may include the RFIC (e.g., 240 in FIG. 1) as described above. That is, in an example embodiment, the antenna and the RFIC may be implemented into one module.

The antenna module 310 may include a temperature sensor 310*a* and a power detector 310*b*. The antenna module 312 may include a temperature sensor 312*a* and a power detector 312*b*.

The IFIC 320 may apply, to the antenna modules 310 and 312, a control signal MCS for data reception and may receive the Isignal I and the Qsignal Q from each of the antenna modules 310 and 312. Further, the IFIC 320 may apply, to the antenna modules 310 and 312, a control signal MCS for data transmission and may provide the Isignal I and the Qsignal Q to each of the antenna modules 310 and 312. Further, the IFIC 320 may apply the control signal MCS to the antenna modules 310 and 312 to perform antenna switching.

Temperature information sensed from the temperature sensors 310*a* and 312*a* may be provided to the IFIC 320. The temperature information may be provided to the baseband modem 330, such that the baseband modem 330 may use the temperature information to identify a heat emission state of each of the antenna modules 310 and 312.

Power information sensed from the power detectors 310*b* and 312*b* may be provided to the IFIC 320. The power information may be provided to the baseband modem 330, such that the baseband modem 330 may use the power information to calculate the limit power PSARLIMIT(i) based on the specific absorption rate (SAR) of each of the antenna modules 310 and 312.

The baseband modem 330 may receive the Isignal I and the Qsignal Q from the IFIC 320 for data reception, or may provide the Isignal I and the Qsignal Q to the IFIC 320 for data transmission.

The baseband modem 330 may serve as a controller that applies a control signal ICCS to the IFIC 320 to control an operation of the user equipment 300.

The baseband modem 330 applies the control signal ICCS to the IFIC 320 to select the antenna module 310 or 312 to be used for signal transmission and reception. For this purpose, the baseband modem 330 may include a RSRP estimator 332, a SAR controller 334 and an antenna switching controller 336.

The RSRP estimator 332 may measure the RSRP of each of the antenna modules 310 and 312 that currently receives a signal or transmits a signal.

The SAR controller 334 may calculate a SAR value based on power information. The antenna switching controller 336 may control whether or not to switch the antenna based on the RSRP, the SAR value, the temperature information, etc. An operation of the baseband modem 330 is the same as previously described and thus duplicate descriptions thereof are omitted.

Figure 12:
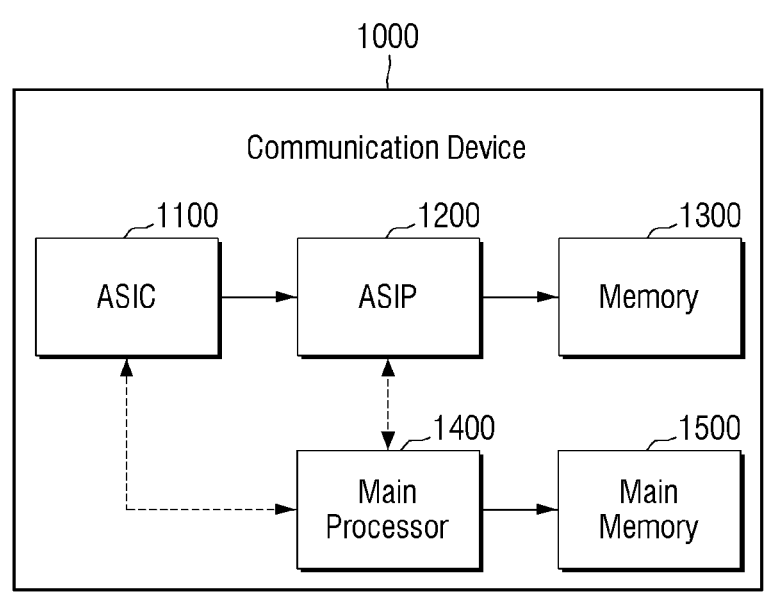
FIG. 12 is a diagram showing a communication device according to some embodiments.

FIG. 12 is a diagram showing a communication device according to some embodiments.

In some embodiments, a communication device 1000 may be included in the user equipment 200 shown in FIG. 1 and/or the user equipment 300 shown in FIG. 11.

The communication device 1000 may include an ASIC (Application Specific Integrated Circuit) 1100, an ASIP (Application Specific Instruction set Processor) 1200, a memory 1300, a main processor 1400 and a main memory 1500. Two or more of the ASIC 1100, the ASIP 1200 and the main processor 1400 may communicate with each other.

Further, at least two of the ASIC 1100, the ASIP 1200, the memory 1300, the main processor 1400, and the main memory 1500 may be embedded in one chip.

The ASIP 1200 may be an integrated circuit customized for a specific use, and may support a dedicated instruction set for a specific application, and may execute instructions included in the instruction set.

The memory 1300 may communicate with the ASIP 1200 and may act as a non-transitory storage device and thus may store therein a plurality of instructions as executed by the ASIP 1200. For example, the memory 1300 may include any type of memories accessible from the ASIP 1200, such as a RAM (Random Access Memory), a ROM (Read Only Memory), a tape, a magnetic disk, an optical disk, a volatile memory, a non-volatile memory, and any combination thereof.

The main processor 1400 may execute a plurality of instructions to control the communication device 1000. For example, the main processor 1400 may control the ASIC 1100 and the ASIP 1200, may process data received via the wireless communication network, or may process a user input to the communication device 1000. In some embodiments, the main processor 1400 may act as the baseband modem (260 in FIGS. 1 and 330 in FIG. 11) as described above.

The main memory 1500 may communicate with the main processor 1400 and may act as a non-transitory storage device to store therein a plurality of instructions executed by the main processor 1400. For example, the main memory 1500 may be any type of memories accessible from the main processor 1400, such as RAM (Random Access Memory), ROM (Read Only Memory), a tape, a magnetic disk, an optical disk, a volatile memory, a non-volatile memory, and any combination thereof.

The operation of the user equipment as described above may be performed by at least one of the components included in the communication device 1000 in FIG. 12. The operations described above may be implemented using the plurality of instructions stored in the memory 1300. The operations as described above may be implemented by the ASIP 1200 executing the plurality of instructions stored in the memory 1300.

In some embodiment, the operations as described above may be performed by a hardware block designed via logic synthesis or the like. The hardware block may be included in the ASIC 1100.

In some embodiment, the operations as described above may be implemented using the plurality of instructions stored in the main memory 1500. The operations as described above may be implemented by the main processor 1400 executing the plurality of instructions stored in the main memory 1500.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Those skilled in the art would appreciate that many variations and modifications may be made to the example embodiments without substantially departing from the principles of the disclosure. Therefore, the disclosed example embodiments of the disclosure are used in a generic and descriptive sense only and not for purposes of limitation.

What is claimed is:

1. A data transmission device comprising:
a plurality of front-end modules associated with n (n being a natural number equal to or greater than two) number of antennas, respectively; and
a controller configured to select a front-end module to be used for data communication from among the plurality of front-end modules,
wherein the controller is further configured to:
determine a temperature of each of the plurality of front-end modules; and
select, from among the plurality of front-end modules, a front-end module having a temperature lower than or equal to a threshold temperature and corresponding to a maximum received power of a receiving device, among received powers of the receiving device corresponding to the plurality of front-end modules, and
wherein the controller is further configured to obtain each of the received powers of the receiving device by performing, for each index i (i being a natural number equal to or greater than zero and equal to or smaller than (n−1)):
obtaining a transmit power of a front-end module having an index i;
obtaining a limit power of the front-end module having the index i based on a specific absorption rate (SAR) requirement or a maximum permissible exposure (MPE) requirement that is specific to the front-end module having the index i; and
obtaining a received power of the receiving device when transmitting data from the front-end module having the index i, based on the transmit power and the limit power of the front-end module having the index i.

2. The data transmission device of claim 1, wherein the controller is further configured to obtain the received power of the receiving device based on a smaller one of the transmit power and the limit power.

3. The data transmission device of claim 2, wherein the controller is further configured to obtain the received power of the receiving device based on a path loss when transmitting data to the receiving device by using a corresponding front-end module, and based on a gain of a reception antenna of the receiving device.

4. The data transmission device of claim 3, wherein the controller is further configured to obtain the received power of the receiving device by using a following equation:

PRX($i$)=MIN(PSARLIMIT($i$)−$d$,P($i$))−PL($i$)+$Gb$,

PSARLIMIT(i) denotes the limit power based on the specific absorption rate requirement or the maximum permissible exposure requirement of the front-end module having the index i,
d denotes a margin value,
P(i) denote the transmit power of the front-end module having the index i,
PL(i) denotes a path loss when data is transmitted by using the front-end module having the index i, and
Gb denotes the gain of the reception antenna of the receiving device.

5. The data transmission device of claim 1, wherein the controller is further configured to perform a fallback operation based on an absence of the front-end module having the temperature lower than or equal to the threshold temperature.

6. The data transmission device of claim 1, further comprising:
couplers configured to connect the n number of antennas to the plurality of front-end modules, respectively; and
a power detector configured to detect power of a loopback signal generated from each of the couplers, and provide the detected power to the controller.

7. The data transmission device of claim 6, further comprising a radio frequency integrated chip (RFIC) configured to receive an Isignal and a Qsignal from each of the plurality of front-end modules and configured to provide the Isignal and the Qsignal to the controller,
wherein the power detector is included in the RFIC.

8. The data transmission device of claim 1, wherein the controller includes a baseband modem.

9. The data transmission device of claim 1, wherein the controller is further configured to select the front-end module corresponding to a maximum received power of a base station as the receiving device.

10. A method for transmitting data, the method comprising:
providing a first front-end module associated with a first antenna and a second front-end module associated with a second antenna;
transmitting first data to a base station by using the first front-end module associated with the first antenna;
determining a first temperature of the first front-end module and a second temperature of the second front-end module;
obtaining a first transmit power of the first front-end module and a second transmit power of the second front-end module;
obtaining a first limit power of the first front-end module and a second limit power of the second front-end module based on a specific absorption rate (SAR) requirement;
obtaining a first received power of the base station based on the first transmit power and the first limit power;
obtaining a second received power of the base station based on the second transmit power and the second limit power; and
based on the second received power being greater than the first received power, and the second temperature being lower than a threshold temperature, transmitting second data to the base station by using the second front-end module associated with the second antenna,
wherein each of the first received power and the second received power is obtained by performing, for each index i (i being 0 or 1):

obtaining a transmit power of a front-end module having an index i;

obtaining a limit power of the front-end module having the index i based on a specific absorption rate (SAR) requirement or a maximum permissible exposure (MPE) requirement that is specific to the front-end module having the index i; and obtaining a received power of the base station when transmitting data from the front-end module having the index i, based on the transmit power and the limit power of the front-end module having the index i.

11. The method of claim 10, further comprising, after transmitting the second data to the base station by using the second front-end module associated with the second antenna, waiting for a predetermined time duration.

12. The method of claim 10, further comprising, before obtaining the first transmit power and the second transmit power, determining whether reference signal received power (RSRP) of each of the first antenna and the first front-end module is smaller than a threshold RSRP.

13. The method of claim 10, wherein the first received power is determined based on a smaller one of the first transmit power and the first limit power, and wherein the second received power is determined based on a smaller one of the second transmit power and the second limit power.

14. The method of claim 13, wherein the first received power is determined based on a path loss when transmitting data to the base station by using the first antenna and a gain of a reception antenna of the base station, and wherein the second received power is determined based on a path loss when transmitting data to the base station by using the second antenna and the gain of the reception antenna of the base station.

15. The method of claim 14, wherein each of the first received power and the second received power is obtained based on a following equation:

$$PRX(i)=MIN(PSARLIMIT(i)-d,P(i))-PL(i)+Gb,$$

PSARLIMIT(i) denotes the limit power based on the specific absorption rate requirement of the front-end module having the index i, d denotes a margin value, P(i) denote the transmit power of the front-end module having the index i, PL(i) denotes a path loss when data is transmitted by using the front-end module having the index i, and Gb denotes the gain of the reception antenna of the base station.

16. The method of claim 10, further comprising performing a fallback operation based on the second received power being greater than the first received power, and the second temperature being higher than the threshold temperature.

17. The method of claim 10, further comprising performing a fallback operation based on each of the first temperature and the second temperature being higher than the threshold temperature.

18. A method for transmitting data, the method comprising:

providing a plurality of front-end modules respectively associated with n (n being a natural number equal to or greater than two) number of antennas;

determining a temperature of each of the plurality of front-end modules;

selecting, from among the plurality of front-end modules, at least one front-end module having a temperature equal to or lower than a threshold temperature;

obtaining a received power of a base station corresponding to each of the at least one front-end module based on a specific absorption rate (SAR) requirement; and selecting, from among the selected at least one front-end module, a front-end module corresponding to a maximum received power of the base station, wherein the obtaining the received power of the base station includes performing, for each index i (i being a natural number equal to or greater than zero and equal to or smaller than (n−1)):

obtaining a transmit power of a front-end module having an index i;

obtaining a limit power of the front-end module having the index i based on a specific absorption rate (SAR) requirement that is specific to the front-end module having the index i; and obtaining a received power of the base station when transmitting data from the front-end module having the index i, based on the transmit power and the limit power of the front-end module having the index i.

* * * * *